(12) United States Patent
Bloom et al.

(10) Patent No.: US 11,175,657 B1
(45) Date of Patent: Nov. 16, 2021

(54) SAFE SYSTEM CONTROLLER FOR AUTONOMOUS AIRCRAFT

(71) Applicant: Rockwell Collins, Inc., Cedar Rapids, IA (US)

(72) Inventors: Nicholas H. Bloom, Marion, IA (US); Angus L. McLean, Bradenton, FL (US); James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 706 days.

(21) Appl. No.: 15/836,413

(22) Filed: Dec. 8, 2017

(51) Int. Cl.
*G05D 1/00* (2006.01)
*B64D 45/00* (2006.01)
*G07C 5/08* (2006.01)
*G05D 1/10* (2006.01)

(52) U.S. Cl.
CPC ........... *G05D 1/0055* (2013.01); *B64D 45/00* (2013.01); *G05D 1/0088* (2013.01); *G05D 1/101* (2013.01); *G07C 5/0808* (2013.01); *B64D 2045/0085* (2013.01)

(58) Field of Classification Search
None
See application file for complete search history.

(56) References Cited

U.S. PATENT DOCUMENTS 6,122,572 A * 9/2000 Yavnai ................. G05D 1/0088
342/13

* cited by examiner

*Primary Examiner* — Todd Melton
*Assistant Examiner* — Jason R Roberson
(74) *Attorney, Agent, or Firm* — Suiter Swantz pc llo (57) ABSTRACT

The method and corresponding system for autonomous operation may include implementing a safe system controller for autonomous vehicles to receive a set of event data for an event encountered during operation of a vehicle from a status engine of the vehicle; analyze the received set of event data; determine a vehicle system state based on the analyzed set of event data; receive a set of automation operational parameters from an automation engine of the vehicle; receive a set of autonomy operational parameters from an autonomy engine of the vehicle; determine a response to the event from the set of automation operational parameters and the set of autonomy operational parameters based on the determined vehicle system state; and provide the determined response to the automation engine and the autonomy engine to adjust an operational parameter of the vehicle.

23 Claims, 7 Drawing Sheets

SAFE SYSTEM CONTROLLER FOR AUTONOMOUS AIRCRAFT

BACKGROUND OF THE INVENTION

Vehicles including air, land, or water-based personal equipment or vehicles; air, land, or water-based commercial equipment or vehicles; air, land, or water-based military equipment or vehicles; air, land, or water-based construction equipment or vehicles; and the like are becoming increasingly autonomous as improvements in the field of automation is made. However, in many instances automation has not risen to a level of complete autonomy.

One such instance where automation systems fall short of complete autonomy is when events occur during the operation of the vehicle that are outside the bounds of the pre-programmed automation information stored on board the vehicle and/or stored at an exterior location. For example, the event may require adjusting control or trajectory of the vehicle, where doing so may result in operating the vehicle beyond an amount deemed to be acceptable within the pre-programmed information of the autonomous system (e.g., to a point nearly or actually damaging the vehicle). By way of another example, the event may be so complex that defining variables and conditional statements for each possible event contingency is impractical. This lack of capability to fully analyze the response of autonomous elements of an automation system to these (and other) types of events has resulted in these types of events still being managed by an on-board operator. Additionally, this lack of capability to fully analyze the response of autonomous elements of an automation system to these (and other) types of events has resulted in autonomous systems being difficult to certify for safe operation.

Therefore, it would be advantageous to provide a system that cures the shortcomings described above.

SUMMARY

In one aspect, the inventive concepts disclosed herein are directed to a method. The method may include acquiring a set of event data for an event encountered during operation of a vehicle. The method may include receiving the set of event data from one or more status engines of the vehicle. The method may include analyzing the received set of event data. The method may include determining a vehicle system state based on the analyzed set of event data. The method may include receiving a set of automation engine data from one or more automation engines of the vehicle, where the set of automation engine data includes a set of automation operational parameters. The method may include receiving a set of autonomy engine data from one or more autonomy engines of the vehicle, where the set of autonomy engine data includes a set of autonomy operational parameters. The method may include determining one or more responses to the event from at least one of the set of automation operational parameters or the autonomy operational parameters based on the determined vehicle system state. The method may include providing the determined one or more responses to at least one of the one or more automation engines of the vehicle or the one or more autonomy engines of the vehicle to adjust one or more operational parameters of the vehicle.

In a further aspect, the inventive concepts disclosed herein are directed to an autonomous vehicle. The autonomous vehicle may include one or more status engines configured to receive a set of event data for an event encountered during operation. The autonomous vehicle may include one or more automation engines. The autonomous vehicle may include one or more autonomy engines. The autonomous vehicle may include a safe system controller. The safe system controller may include one or more processors configured to execute a set of program instructions stored on a memory medium. The set of program instructions may be configured to cause the one or more processors to receive the set of event data from the one or more status engines. The set of program instructions may be configured to cause the one or more processors to analyze the received set of event data. The set of program instructions may be configured to cause the one or more processors to determine a vehicle system state based on the analyzed set of event data. The set of program instructions may be configured to cause the one or more processors to receive a set of automation engine data from the one or more automation engines, where the set of automation engine data includes a set of automation operational parameters. The set of program instructions may be configured to cause the one or more processors to receive a set of autonomy engine data from the one or more autonomy engines, where the set of autonomy engine data includes a set of autonomy operational parameters. The set of program instructions may be configured to cause the one or more processors to determine one or more responses to the event from at least one of the set of automation operational parameters or the autonomy operational parameters based on the determined vehicle system state. The set of program instructions may be configured to cause the one or more processors to provide the determined one or more responses to at least one of the one or more automation engines or the one or more autonomy engines to adjust one or more operational parameters of the vehicle.

In a further aspect, the inventive concepts disclosed herein are directed to a system. The system may include a safe system controller. The safe system controller may include one or more processors. The one or more processors may be configured to receive a set of data from at least one of one or more status engines, one or more automation engines, or one or more autonomy engines. The one or more processors may be configured to execute a set of program instructions stored on a memory medium. The set of program instructions may be configured to cause the one or more processors to receive the set of event data from the one or more status engines. The set of program instructions may be configured to cause the one or more processors to analyze the received set of event data. The set of program instructions may be configured to cause the one or more processors to determine a system state based on the analyzed set of event data. The set of program instructions may be configured to cause the one or more processors to receive a set of automation engine data from the one or more automation engines, where the set of automation engine data includes a set of automation operational parameters. The set of program instructions may be configured to cause the one or more processors to receive a set of autonomy engine data from the one or more autonomy engines, where the set of autonomy engine data includes a set of autonomy operational parameters. The set of program instructions may be configured to cause the one or more processors to determine one or more responses to the event from at least one of the set of automation operational parameters or the autonomy operational parameters based on the determined system state. The set of program instructions may be configured to cause the one or more processors to provide the determined one or more responses to at least one of the one or more automation engines or the one or more autonomy engines to adjust one or more operational parameters of the system.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a safe system controller for an autonomous vehicle. More particularly, embodiments of the inventive concepts disclosed herein are directed to a safe system controller for an autonomous vehicle, where the safe system controller includes the capability to determine counter-procedural measures in response to events that occur during the operation of the vehicle, where the occurring events are outside the bounds of pre-programmed automation information stored on board the autonomous vehicle and/or stored at an exterior location.

For purposes of the instant disclosure, the term "automation" as used herein is the use of machinery to perform tasks normally performed by humans, being bounded or limited on an optimization curve with respect to the difficulty of tasks the machinery can perform.

For purposes of the instant disclosure, the terms "autonomy" or "autonomous" as used herein is an ability to perform a task at a level of complexity akin to the complexity of human intuition. For example, the higher a system is on the complexity curve, the more autonomy the system has, and the more value will be attached to that system.

It is noted herein that although automated systems may be increasingly optimized, there may exist a gap between optimized automated systems and autonomous systems across which an optimized automated system does not cross.

For purposes of the present disclosure, the terms "engine" or "block" as used herein means a combination of hardware and software configured to perform one or more steps, processes and/or algorithms of the inventive concepts disclosed herein.

For purposes of the present disclosure, the term "maneuver" as used herein means the use of kinematic and potential forces to produce a movement or a series of movements, which are usually performed by an object, machine, or vehicle, with respect to another object, machine, or vehicle (e.g., evasive, tactical, and/or formation maneuvers).

Figure 1A:
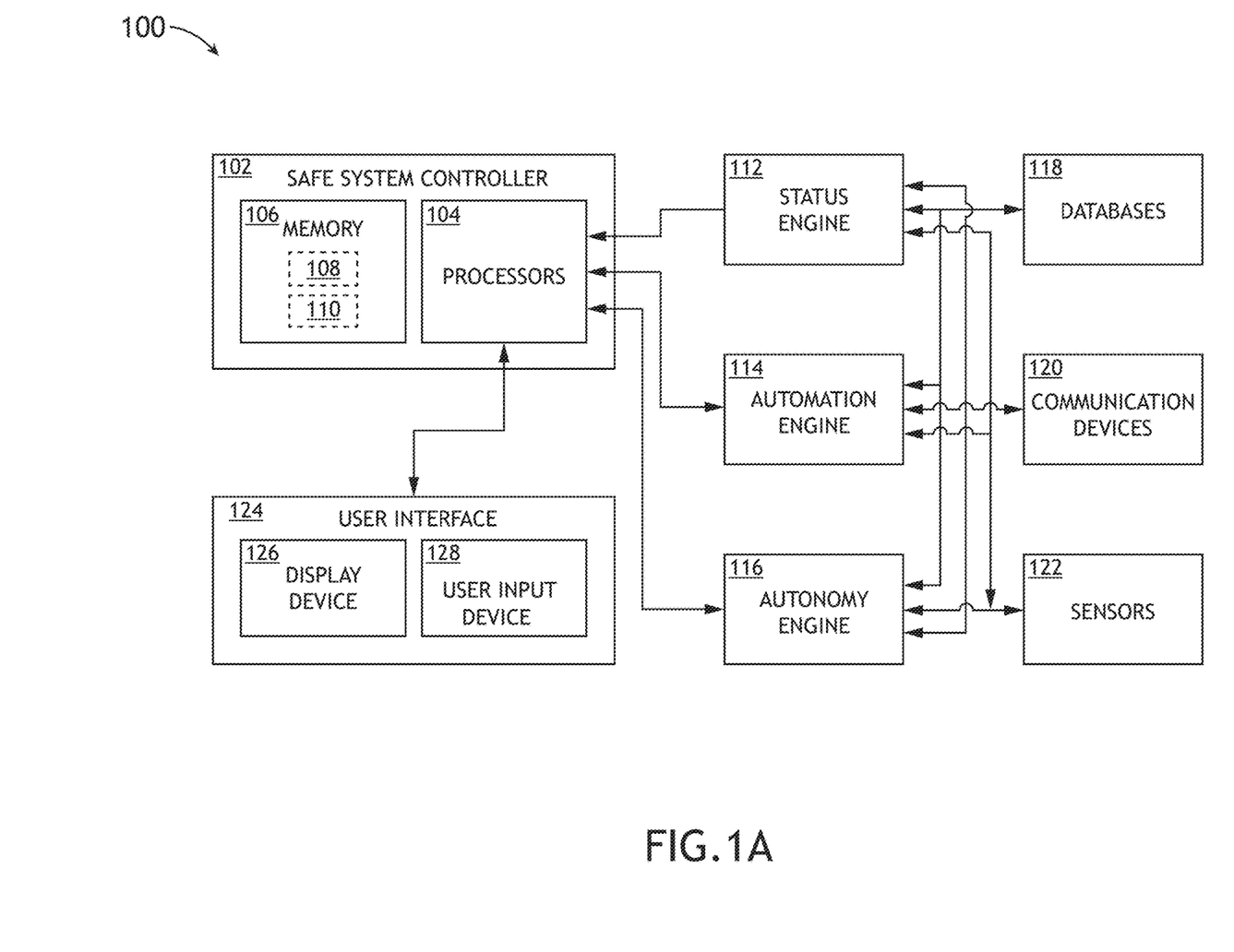
FIG. 1A is a simplified schematic of an exemplary embodiment of a safe system controller for an autonomous system, according to the inventive concepts disclosed herein.

Referring now to FIG. 1, an embodiment of a system 100 according to the inventive concepts is disclosed herein. The system 100 may include a safe system controller 102. The safe system controller 102 may include one or more processors 104 and memory 106. The memory 106 may store one or more databases 108 and/or a set of program instructions 110. The one or more processors 104 may be configured to communicate with the one or more databases 108 (e.g., receive and/or transmit a set of data) and/or execute the set of program instructions 110 to carry out one or more of the various steps of the inventive concepts disclosed herein.

The safe system controller 102 may be communicatively coupled to one or more status engines 112, one or more automation engines 114, and/or one or more autonomy engines 116. For example, the one or more status engines 112, the one or more automation engines 114, and/or the one or more autonomy engines 116 may be integrated into the system 100. By way of another example, the one or more status engines 112, the one or more automation engines 114, and/or the one or more autonomy engines 116 may be implemented as a "bolt-on" unit or line replacement unit (LRU) couplable to the system 100. In this regard, the system 100 may be configured for autonomous operation and/or may be converted to being configured for autonomous operation.

The safe system controller 102 may be configured to receive and/or acquire data or information from other systems or sub-systems (e.g., the one or more status engines 112, the one or more automation engines 114, the one or more autonomy engines 116, and/or a user interface 124) of the system 100 by a transmission medium that may include wireline and/or wireless portions. The safe system controller 102 may additionally be configured to transmit data or information (e.g., the output of one or more procedures of the inventive concepts disclosed herein) to one or more systems or sub-systems (e.g., the one or more status engines 112, the one or more automation engines 114, the one or more autonomy engines 116, and/or the user interface 124) of the system 100 by a transmission medium that may include wireline and/or wireless portions. In this regard, the transmission medium may serve as a data link between the safe system controller 102 and the other subsystems of the system 100. Additionally, the safe system controller 102 may be configured to send data to external systems via a transmission medium (e.g., network connection).

It is noted herein the one or more status engines 112, the one or more automation engines 114, and/or the one or more autonomy engines 116 may be configured to receive and/or transmit data between one another directly (e.g., without the need for an intermediary such as the safe system controller 102). Therefore, the above description should not be interpreted as a limitation on the present disclosure but merely an illustration.

The one or more processors 104 may include any one or more processing elements known in the art. In this sense, the one or more processors 104 may include any microprocessor device configured to execute algorithms and/or program instructions. For example, the one or more processors 104 may consist of a vehicle on-board computer, handheld computer (e.g. tablet, smartphone, or phablet), desktop computer, mainframe computer system, workstation, image computer, parallel processor, or other computer system (e.g., networked computer) configured to cause the system 100 to perform one or more of the inventive concepts disclosed herein. It should be recognized that the steps described throughout the present disclosure may be carried out by a single computer system or, alternatively, multiple computer systems. In general, the term "processor" may be broadly defined to encompass any device (e.g., a system on a chip (SOC), a field programmable gate array (FPGA), an application-specific integrated circuit (ASIC), or the like) including one or more processing elements, which execute the one or sets of program instructions 110 from a non-transitory memory medium (e.g., the memory 106). Moreover, different subsystems of the system 100 (e.g., the one or more status engines 112, the one or more automation engines 114, the one or more autonomy engines 116, and/or the user interface 124) may include processor or logic elements suitable for carrying out at least a portion of the steps described throughout the present disclosure. Therefore, the above description should not be interpreted as a limitation on the present disclosure but merely an illustration.

The memory 106 may include any storage medium known in the art suitable for storing the set of program instructions 110 executable by the associated one or more processors 104 to carry out the various steps of the inventive concepts disclosed herein. For example, the memory 106 may include a non-transitory memory medium. For instance, the memory 106 may include, but is not limited to, a read-only memory, a random access memory, a magnetic or optical memory device (e.g., disk), a magnetic tape, a solid state drive and the like. The memory 106 may be configured to provide display information to a display device 126 of the user interface 124 and/or the output of the various steps of the inventive concepts disclosed herein. The memory 106 may be housed in a common controller housing with the one or more processors 104. The memory 106 may, alternatively or in addition, be located remotely with respect to the physical location of the processors 104 and/or the safe system controller 102. For instance, the one or more processors 104 and/or the safe system controller 102 may access a remote memory (e.g., server), accessible through a network (e.g., internet, intranet and the like).

The memory 106 may additionally store one or more databases 108. The one or more databases 108 may store a set of data that assist the safe system controller 102 in determining whether transmitted control commands include outputs that are within a safety envelope and/or meet a baseline of safe operation of the system 100. The set of data may include up to a four-dimensional position set of coordinates (e.g., a latitude coordinate, a longitude coordinate, an elevation, and/or a time bin value). The set of data may be pre-loaded into the memory 106 prior to operation. Alternatively or in addition, the set of data may be received by the system 100 during operation.

For example, the set of data may be received from one or more external databases 118 and/or from a third-party (e.g.

an air traffic controller and/or area aircraft) via one or more communication devices 120. The one or more communication devices 120 may include, but are not limited to, one or more antennae, one or more GPS receivers, one or more differential GPS receivers, one or more Global Navigation Satellite Systems (GNSS) system receivers, one or more ADS-B receivers, one or more precision navigation systems, one or more radios for performing angle of arrival (AOA) or time difference of arrival (TDOA) determinations, or the like.

By way of another example, the set of data may be received from one or more sensors 122. For instance, the one or more sensors 122 may scan the area and gather one or more positional coordinates for the set of environmental data (e.g., terrain data, obstacle data, or the like). Additionally, the one or more sensors 122 may include, but are not limited to, one or more passive infrared sensors, one or more positional head-tracking sensors, one or more optical sensors, one or more sonic sensors, one or more position sensors, one or more environment sensors, one or more Light Detection and Ranging (LIDAR) sensors, one or more cameras for imaging real-world identifiable features and performing a simultaneous localization and mapping (SLAM) relative position determination, or the like.

The set of data may include, but are not limited to, a set of navigation data, one or more flight plans, and/or one or more updated flight plans. For example, the set of navigation data may include a set of environmental data such as, but not limited to, a set of known terrain data, a set of known obstacle data, a set of unknown obstacle data obtained during operation, a set of unknown terrain data obtained during operation, or the like. For instance, the set of terrain data may include, but is not limited to, topology information, a four-dimensional position set of coordinates, and/or one or more physical dimensions for one or more natural formations (e.g., mountains, trees, lakes, or oceans). Additionally, the set of obstacle data may include, but are not limited to, a four-dimensional position set of coordinates and/or one or more physical dimensions of infrastructure including, but not limited to, buildings, towers, power lines, and/or runways relative to the aircraft 100. Further, the set of obstacle data may additionally include, but are not limited to, a four-dimensional position set of coordinates of weather data (e.g., windspeed, barometric pressure, amount of precipitation, or cloud cover density) and/or one or more potential sources of hostile aggression (e.g., surface-to-air missile (SAM) towers).

By way of another example, the one or more flight plans may be pre-loaded into the memory 106 prior to operation and/or may be received by the safe system controller 102 during operation. For example, data corresponding to one or more flight paths may be received from the one or more external databases 118, from a third-party via the one or more communication devices 120 and/or via the one or more sensors 122. By way of another example, the one or more updated flight paths may be generated, at least in part, by combining the one or more flight paths with the set of environmental data (e.g., known terrain data, known obstacle data, unknown obstacle data obtained during operation, unknown terrain data obtained during operation, or the like).

The set of program instructions 110 may be configured to operate via a control algorithm, a neural network (e.g., with states represented as nodes and hidden nodes and transitioning between them till an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR regression), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the set of program instructions 110 may be configured to operate via proportional control, feedback control, feedforward control, integral control, proportional-derivative (PD) control, proportional-integral (PI) control, proportional-integral-derivative (PID) control, or the like.

The set of program instructions 110 may be configured to operate via an algorithm subject to guidelines and/or standards put forth by, but not limited to, one or more of the Federal Aviation Administration (FAA), the European Aviation Safety Agency (EASA) or any other flight certification agency; the American National Standards Institute (ANSI) or any other standards setting organization; the Radio Technical Commission for Aeronautics (RTCA) or any other guidelines organization; or the like.

The set of program instructions 110 may include a set of program instructions configured to cause the one or more processors 104 to receive a set of sensor data and receive a set of on-board systems data from the one or more status engines 112. The set of program instructions 110 may additionally include a set of program instructions configured to cause the one or more processors 104 to analyze the received set of sensor data and the received set of on-board systems data. The set of program instructions 110 may additionally include a set of program instructions configured to cause the one or more processors 104 to determine a vehicle system state based on the analyzed set of sensor data and the analyzed set of on-board systems data. The set of program instructions 110 may additionally include a set of program instructions configured to cause the one or more processors 104 to receive a set of automation engine data from the one or more automation engines 114. The set of program instructions 110 may additionally include a set of program instructions configured to cause the one or more processors 104 to receive a set of autonomy engine data from the one or more autonomy engines 116.

The set of program instructions 110 may additionally include a set of program instructions configured to cause the one or more processors 104 to respond to the event by implementing the set of automation engine data received from the one or more automation engines based on the determined vehicle system state. The set of program instructions 110 may additionally include a set of program instructions configured to cause the one or more processors 104 to respond to the event by implementing the set of autonomy engine data received from the one or more autonomy engines based on the determined vehicle system state. The set of program instructions 110 may additionally include a set of program instructions configured to cause the one or more processors 104 to respond to the event by implementing a hybrid response generated from the set of automation engine data received from the one or more automation engines and the set of autonomy engine data received from the one or more autonomy engines based on the determined vehicle system state. The set of program instructions 110 may additionally include a set of program instructions configured to cause the one or more processors 104 to apply a weighting factor when generating the hybrid response.

Figure 1B:
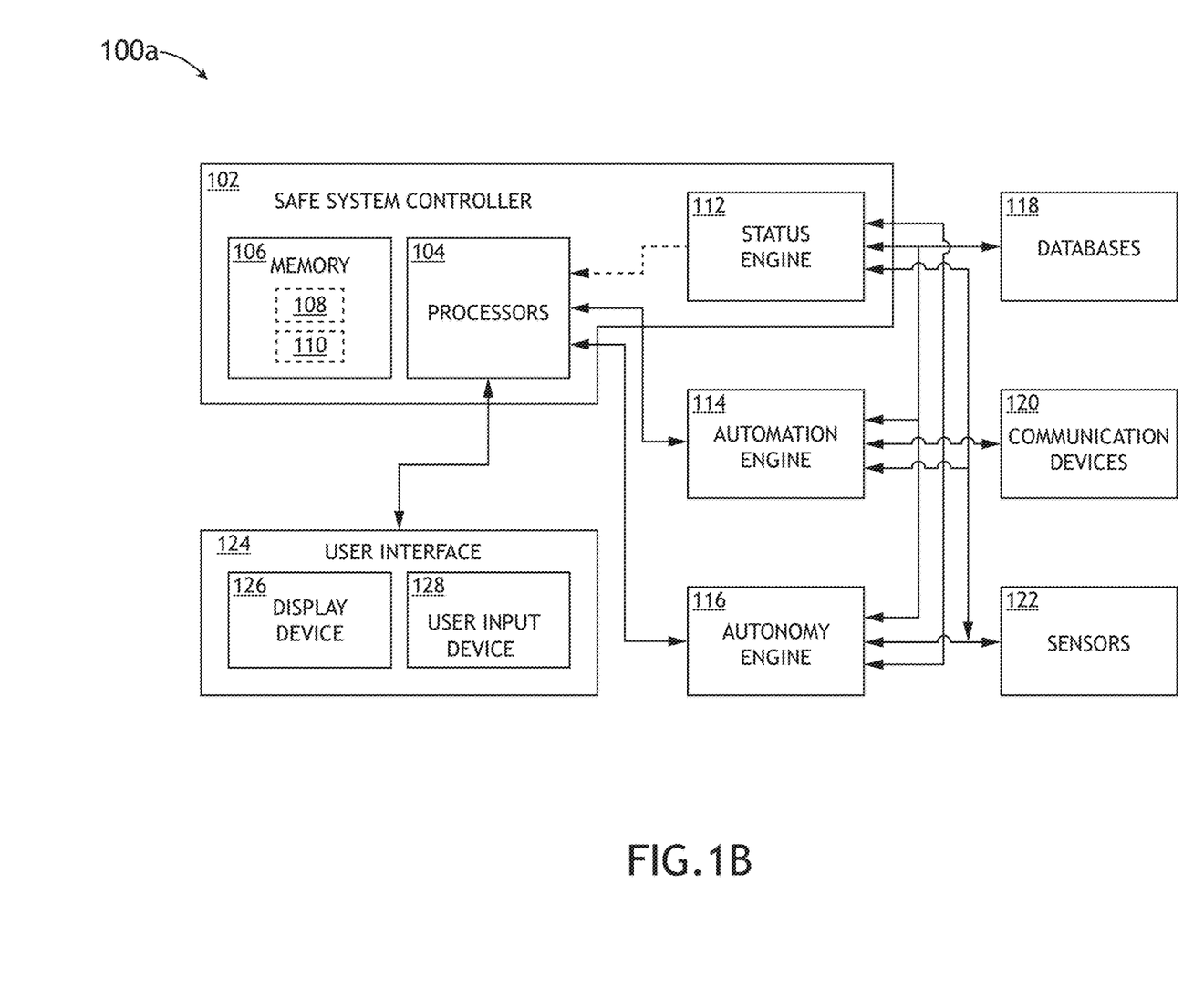
FIG. 1B is a simplified schematic of an exemplary embodiment of a safe system controller for an autonomous vehicle, according to the inventive concepts disclosed herein.
Figure 1C:
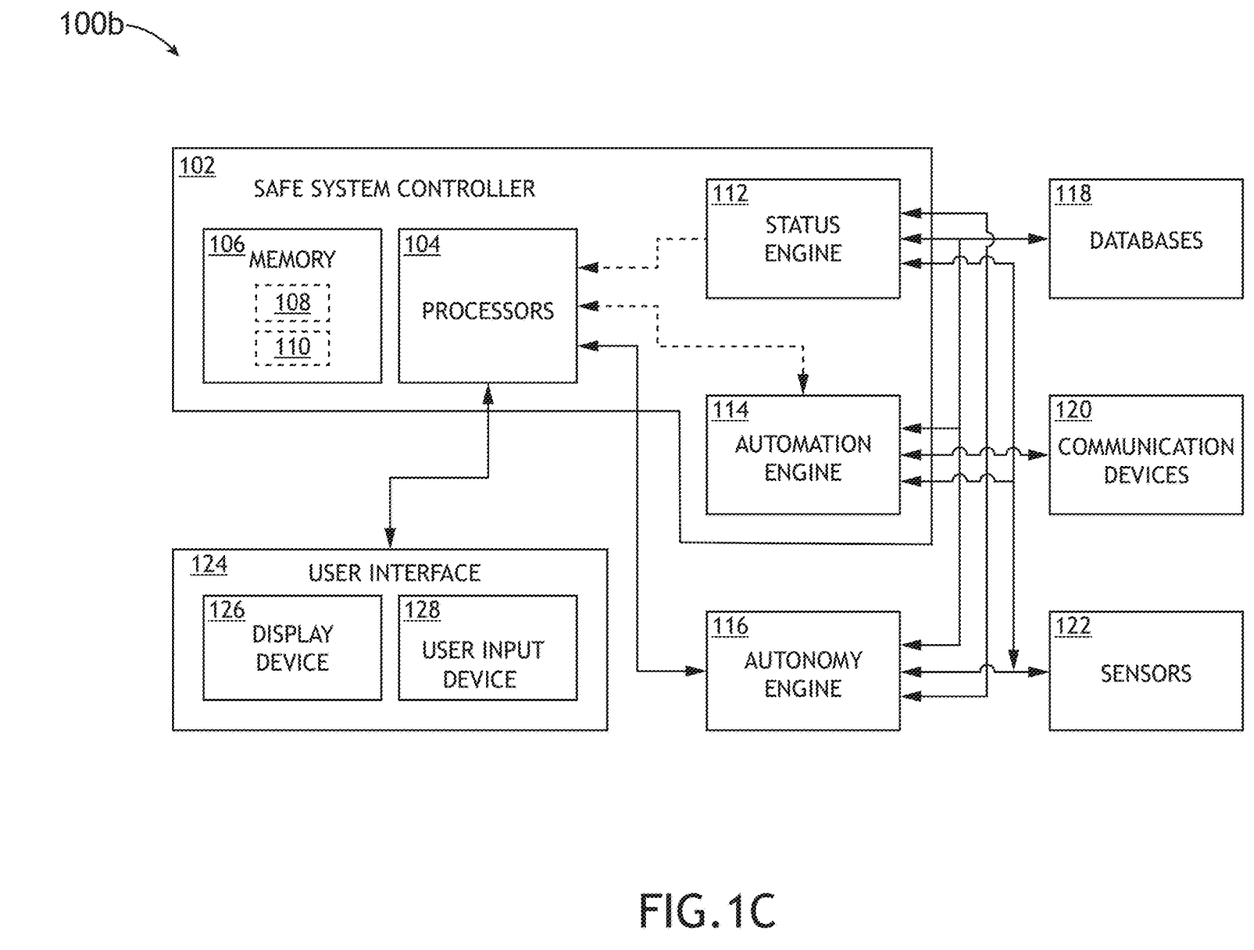
FIG. 1C is a simplified schematic of an exemplary embodiment of a safe system controller for an autonomous vehicle, according to the inventive concepts disclosed herein.

It is noted herein, as illustrated in the exemplary embodiments in FIG. 1A according to the inventive concepts is disclosed herein, that the safe system controller 102, the one or more status engines 112, the one or more automation engines 114, and the one or more autonomy engines 116 may be separate and/or isolated components within the system 100. It is additionally noted herein, as illustrated in the exemplary embodiments in FIG. 1B according to the inventive concepts is disclosed herein, that the one or more status engines 112 may be installed within the safe system controller 102, while the one or more automation engines 114 and the one or more autonomy engines 116 may be separate and/or isolated components within the system 100. It is additionally noted herein, as illustrated in the exemplary embodiments in FIG. 1C according to the inventive concepts is disclosed herein, that the one or more status engines 112 and the one or more automation engines 114 may be installed within the safe system controller 102, while the one or more autonomy engines 116 may be separate and/or isolated components within the system 100. It is additionally noted herein that any number of the one or more status engines 112, any number of the one or more automation engines 114, and/or any number of the one or more autonomy engines 116 may be installed within the safe system controller 102, while the remainder form separate and/or isolated components of the system 100.

For purposes of the instant disclosure, to be "separate and/or isolated" refers to separation via physical (e.g., operable via separate chips and/or cores of the one or more processors 104) and/or temporal (e.g., operable at different times via the same chips and/or cores of the one or more processors 104) installation parameters. Therefore, the above description should not be interpreted as a limitation on the present disclosure but merely an illustration.

The safe system controller 102 may include (or be configured to interact with) the user interface 124, where the user interface 124 provides operator (e.g., driver or pilot) and/or crew access to the safe system controller 102. The user interface 124 may include the display device 126. The user interface 124 may include a user input device 128.

The display device 126 may include any display device known in the art. For example, the display device 126 may include, but is not limited to, a liquid crystal display (LCD). By way of another example, the display device 126 may include, but is not limited to, an organic light-emitting diode (OLED) based display. By way of another example, the display device 126 may include, but is not limited to a CRT display. Those skilled in the art should recognize that a variety of display devices may be suitable for implementation in the present disclosure and the particular choice of display device may depend on a variety of factors, including, but not limited to, form factor, cost, and the like. In a general sense, any of the display device 126 capable of integration with the user input device 128 (e.g., touchscreen, bezel mounted interface, keyboard, mouse, trackpad, and the like) is suitable for implementation in the present disclosure.

The user input device 128 may include any user input device known in the art. For example, the user input device 128 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface, those skilled in the art should recognize that a large number of touchscreen interfaces may be suitable for implementation in the present disclosure. For instance, the display device 126 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present disclosure. The user input device 128 may additionally include, but is not limited to, a bezel mounted interface.

The inventive concepts of the system 100 and the safe system controller 102, as illustrated in FIG. 1, may include additional exemplary embodiments as disclosed herein. In addition, the system 100 and/or the safe system controller 102 may be configured to perform any other steps(s) of any of the exemplary embodiment(s) of the inventive concepts disclosed herein.

Figure 2:
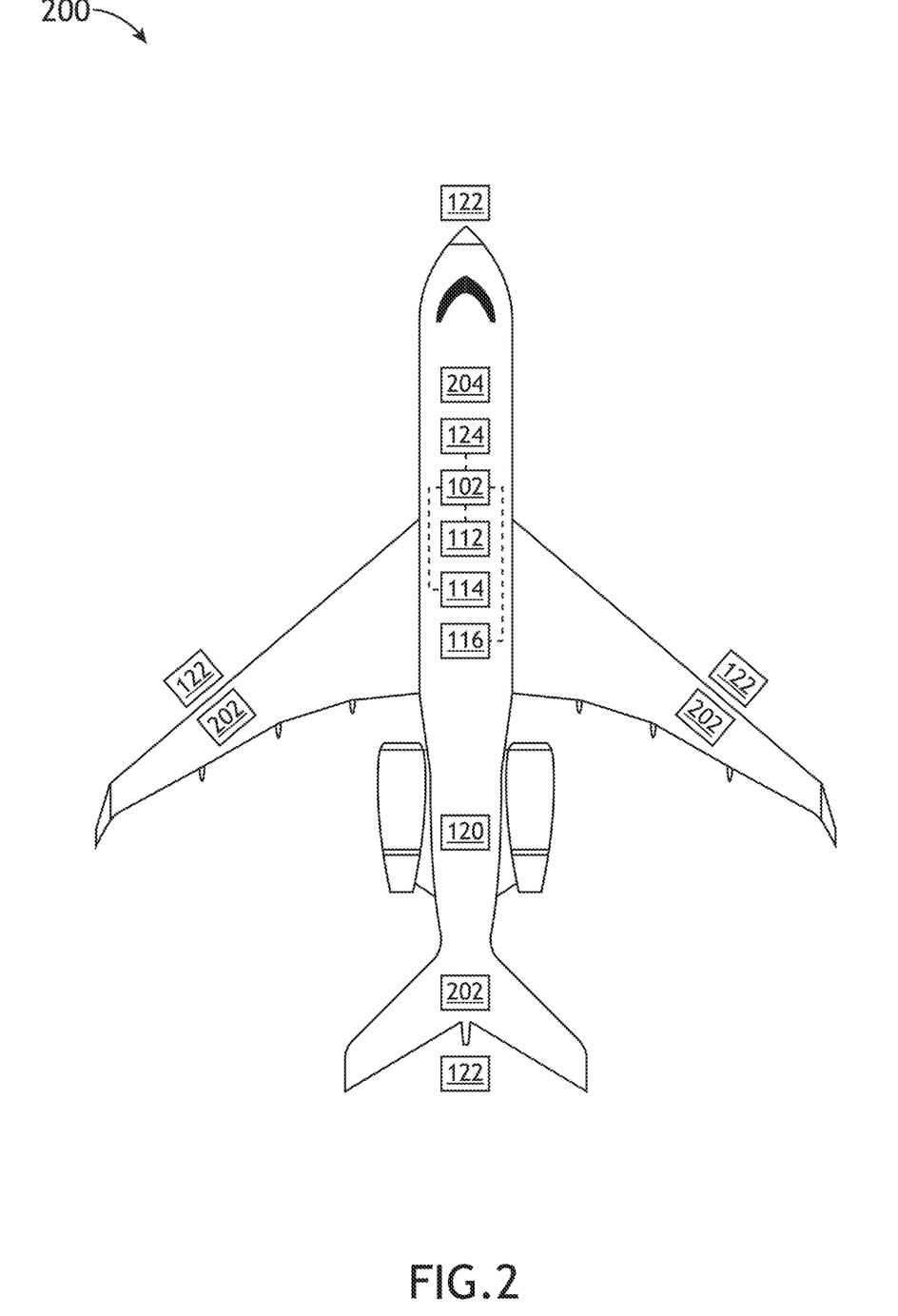
FIG. 2 is a diagrammatic illustration of an autonomous vehicle including a safe system controller, according to the inventive concepts disclosed herein.

Referring now to FIG. 2, an exemplary embodiment of a vehicle 200 including the safe system controller 102 according to the inventive concepts is disclosed herein.

The vehicle 200 may be manned or unmanned. The vehicle 200 may be any air, land, or water-based personal equipment or vehicle; air, land, or water-based commercial equipment or vehicle; air, land, or water-based military equipment or vehicle; air, land, or water-based construction equipment or vehicle known in the art. For example, the vehicle 200 may be a passenger aircraft 200 with an autopilot (e.g., automation engine) function. By way of another example, the vehicle 200 may be, but is not limited to, an unmanned aerial vehicle (UAV), an unmanned aircraft system (UAS), or a manned or unmanned tactical vehicle.

Where the vehicle 200 is an aircraft 200, the aircraft 200 may include the safe system controller 102, the one or more status engines 112, the one or more automation engines 114, the one or more autonomy engines 116, and/or the user interface 124. The aircraft 200 may include one or more on-board systems 202. For example, the one or more on-board systems 202 may include, but are not limited to, a compass, an altimeter (e.g., radar altimeter or a ground tracking radar device), an inertial measurement unit (IMU), a fiber optic gyroscope, a bubble level, an accelerometer, a pitot tube, one or more sensors for cockpit or cockpit-installed components, one or more sensors for wing or wing-installed components, one or more sensors for cabin or cabin-installed components, one or more sensors for tail or tail-installed components, one or more sensors for engine or engine-installed components, or the like. The one or more communication devices 120 and/or the one or more sensors 122 may be coupled to the aircraft 200. For example, the one or more communication devices 120 and/or the one or more sensors 122 may transmit a set of data to and/or receive a set of data from the safe system controller 102.

The safe system controller 102, the one or more status engines 112, the one or more automation engines 114, and/or the one or more autonomy engines 116 may be configured to receive a set of data from and/or transmit a set of data to the one or more on-board systems 202.

Figure 3:
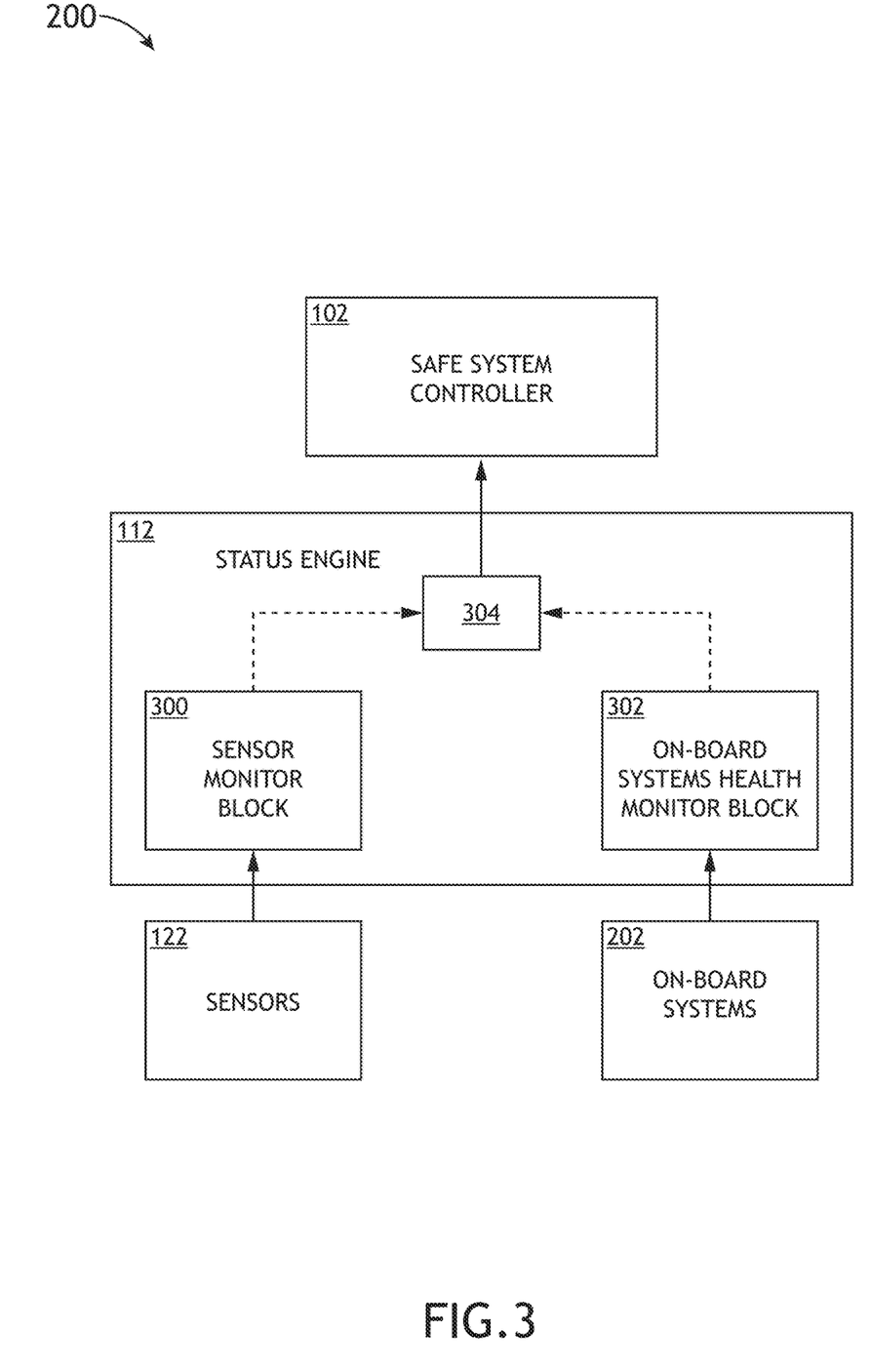
FIG. 3 is a simplified schematic of a status engine communicatively couplable to a safe system controller for an autonomous vehicle, according to the inventive concepts disclosed herein.

The safe system controller 102 of the aircraft 200 may be configured to interface with (or may include) the one or more status engines 112. Referring now to FIG. 3, an exemplary embodiment of a status engine 112 according to the inventive concepts is disclosed herein.

The status engine 112 may include a sensor monitor block 300, where the sensor monitor block 300 receives a set of data from the one or more sensors 122 coupled to the aircraft 200. For example, the sensor monitor block 300 may aggregate, analyze, and/or transmit the set of data from the one or more sensors 122 to the safe system controller 102. For instance, the sensor monitor block 300 may aggregate and/or analyze the set of data from the one or more sensors 122 to determine whether the aircraft 200 is operating within the bounded parameters of the one or more automation engines 114 prior to transmitting the set of data from the one or more sensors 122 to the safe system controller 102.

The status engine 112 may include an on-board systems health monitor block 302, where the on-board systems health monitor block 302 receives a set of data from the one or more on-board systems 202. For example, the on-board systems health monitor block 302 may aggregate, analyze, and/or transmit the set of data from the one or more on-board systems 202 to the safe system controller 102. For instance, the on-board systems health monitor block 302 may aggregate and/or analyze the set of data from the one or more on-board systems 202 to determine whether the one or more on-board systems 202 are operating as expected prior to transmitting the set of data from the one or more on-board systems 202 to the safe system controller 102.

Prior to transmitting the set of data form the one or more sensors 122 and the set of data from the one or more on-board systems 202 to the safe system controller 102, the status engine 112 may combine the aggregated and/or analyzed data from the sensor monitor block 300 and the aggregated and/or analyzed data from the on-board system health monitor block 302 into a single set of data via a combination block 304.

The safe system controller 102 of the aircraft 200 may be configured to interface with (or may include) the one or more automation engines 114. For example, the aircraft 200 may include a single, centralized automation engine 114. By way of another example, the aircraft 200 may include multiple, localized automation engines 114 spread throughout the aircraft 200. The one or more automation engines 114 may be certified by a flight certification agency including, but not limited to, the FAA, the EASA, or any flight certification agency. The one or more automation engines 114 may be implemented for any stage of flight including, but not limited to, landing, rollout and taxi, takeoff, descent, final approach, and cruising or level-flight. The one or more automation engines 114 may be fully analyzable and/or may be operable via fully deterministic functions. The one or more automation engines 114 may receive a set of data from and/or transmit a set of data to the one or more external databases 118, the one or more communication devices 120, and/or the one or more sensors 122. The one or more automation engines 114 may receive a set of data from and/or transmit a set of data to the safe system controller 102 based on the received set of data from the one or more external databases 118, the one or more communication devices 120, and/or the one or more sensors 122. For example, the set of data transmitted to the safe system controller 102 may include a set of automation engine data with a set of pre-programmed instructions to operate the aircraft 200. The one or more automation engines 114 may output solutions to adjust one or more flight controls (e.g., pulling up, rolling right, or the like) and/or adjust flight trajectory (e.g., fly-by-wire protocols).

The safe system controller 102 of the aircraft 200 may be configured to interface with (or may include) the one or more autonomy engines 116. The one or more autonomy engines 116 may be similar to a machine-learned version of a pilot/operator, replicating and implementing a decision-making process when the one or more automation engines 114 may not be capable of responding to one or more unforeseen events (e.g., a set of unknown obstacle data obtained during operation or a set of unknown terrain data obtained during operation). The one or more autonomy engines 116 may not be fully analyzable and/or may not be operable via fully deterministic functions. The one or more autonomy engines 116 may receive a set of data from and/or transmit a set of data to the one or more external databases 118, the one or more communication devices 120, and/or the one or more sensors 122. The one or more autonomy engines 116 may receive a set of data from and/or transmit a set of data to the safe system controller 102 based on the received set of data from the one or more external databases 118, the one or more communication devices 120, and/or the one or more sensors 122. For example, the set of data transmitted to the safe system controller 102 may include a set of autonomy engine data with instructions in response to an unforeseen event that surfaces during operation of the aircraft 200. The one or more autonomy engines 116 may output solutions to adjust one or more flight controls (e.g., pulling up, rolling right, or the like) and/or adjust flight trajectory (e.g., fly-by-wire protocols).

The one or more automation engines 114 may include a bounded set of automation parameters of the aircraft 200. For example, the bounded set of automation parameters may be based on the surrounding airspace and/or operational range of the aircraft 200. For instance, the bounded set of automation parameters may include operation parameters that do not damage the aircraft 200 when fully implemented. The one or more autonomy engines 116 may include a bounded set of autonomy parameters for the aircraft 200. For example, the bounded set of autonomy parameters may include operation parameters based on the aerodynamics and/or physical construction of the aircraft 200. For instance, the bounded set of autonomy parameters may include operation parameters that may damage the aircraft 200 if fully implemented. In this regard, the one or more autonomy engines 116 may be configured to provide solutions typically determined by a pilot/operator and not the one or more automation engines 114, as the one or more automation engines 114 are not programmed to be able to provide the particular level of solution.

The bounded set of automation parameters and/or the bounded set of autonomy parameters may include one or more limits, thresholds, baselines, or appropriate safety levels for observable or real-time parameters such as, but not limited to: maximum/minimum safe altitudes; allowable single-axis control parameters for maintaining flight with respect to a roll axis; allowable two-axis control parameters for maintaining flight with respect to a pitch axis and the roll axis; allowable three-axis control parameters for maintaining flight with respect to the roll axis, the pitch axis, and a yaw axis; allowable parameters for performing landing, rollout, and taxi; allowable parameters for stabilizing flight using a stability augmentation system (SAS); a geofence boundary; a traffic collision detection (e.g., minimum separation distance); safe flight envelope detection; limits on roll; limits on pitch; limits on yaw; limits on roll, pitch, and yaw; limits on descent rate; limits on flight path angle; limits on airspeed; limits on Mach number; limits on load or load factor; limits on aerodynamic angles (e.g., alpha, beta); limits on control surface deflection; limits on control surface pressure; other allowable parameters and/or limits, or the like.

It is noted herein the bounded set of automation parameters and the bounded set of autonomy parameters may be considered a safety envelope for the one or more automation engines or the one or more autonomy engines, respectively. It is additionally noted herein the safety envelope for the one or more automation engines and/or the one or more autonomy engines may be implemented in any stage of flight including, but not limited to, landing, rollout and taxi, takeoff, descent, final approach, and cruising or level-flight.

The bounded set of autonomy parameters for the aircraft 200 may be greater in range than the bounded set of automation parameters for the aircraft 200. For example, the bounded set of automation parameters may include a pitch command allowing for a bank of up to 25 degrees, while the bounded set of autonomy parameters may include a pitch command allowing for a bank of up to 40 degrees. It is noted herein the bounded set of automation parameters for the aircraft 200 and the bounded set of autonomy parameters for the aircraft 200 may include the same value for one or more of the bounded parameters.

The bounded set of autonomy parameters of the one or more autonomy engines 116 may be at least partially static (e.g., include one or more "hard" constraints), where the use of the static subset of the bounded set of autonomy parameters is not dependent on an operating limitation of the aircraft 200. Based on the one or more "hard" constraints, the safe system controller 102 may be configured to direct to the one or more autonomy engines 116 after receiving a suggested autonomy parameter response to an unforeseen event from the one or more autonomy engines 116.

Alternatively or in addition, the bounded set of autonomy parameters of the one or more autonomy engines 116 may be at least partially dynamic (e.g., include one or more "soft" constraints that are more permissive than the one or more "hard" constraints), where the use of the dynamic subset of the bounded set of autonomy parameters is dependent on an operating limitation of the aircraft 200. Based on the one or more "soft" constraints, the one or more autonomy engines 116 may be configured to operate at a higher level (e.g., command high G forces ("Gs")) as necessary based on an operating limitation of the aircraft 200 during the unforeseen event, and inform the safe system controller 102 of such. In this regard, the safe system controller 102 may be configured to trust the one or more autonomy engines 116 to perform a set of protected autonomy parameters, instead of directing the one or more autonomy engines 116 to operate based on a suggested autonomy parameter response.

A dynamic bounded set of autonomy parameters may include a range of values for each of the autonomy parameters, where each value in the autonomy parameter range corresponds with an operating limitation of the aircraft 200 (e.g., altitude, airspeed, flight path angle, maximum gross weight, current gross weight, fuel level, location of fuel in the onboard tanks, configuration of landing gear, configuration of a rudder, configuration of elevators, configuration of wing flaps, configuration or aileron, configuration of spoilers, configuration of slats, or the like). The one or more autonomy engines may select which parameter of the set of autonomy parameters to use based on information from the safe system controller 102, the one or more status engines 112, and/or the one or more automation engines 114. For example, the bounded set of autonomy parameters may include a range of allowable Gs corresponding to various gross weight values of the aircraft 200. For instance, the bounded set of autonomy parameters may include that the aircraft 200 is capable of commanding 2.5 Gs at a maximum gross weight, but also capable of commanding 3 Gs at a gross weight less than the maximum. In this example, the one or more autonomy engines 116 may receive information from the safe system controller 102 regarding the gross weight of the aircraft 200 during the occurrence of an unforeseen event, compare the received gross weight those stored in the set of autonomy parameters, and return the autonomy parameter corresponding to the received gross weight. In this regard, the one or more autonomy engines 116 may be configured to select autonomy parameters based on a relationship between the boundary parameter and the operating limitation of the aircraft 200.

The safe system controller 102 may be configured to detect when the one or more autonomy engines 116 asserts a "soft" constraint that is more permissive than a "hard" constraint. The safe system controller 102 may be configured to permit the one or more autonomy engines 116 positive relief from the "soft" constraints. The safe system controller 102 may be configured to recognize if the one or more autonomy engines 116 have passed a particular "soft" constraint.

As such, the safe system controller 102 may be configured to understand and manage a dynamic relationship between the one or more automation engines 114 and the one or more autonomy engines 116. For example, the safe system controller 102 may subject the one or more automation engines 114 and/or the one or more autonomy engines 116 to a set of absolute operating limitations of the aircraft 200. For instance, the aircraft 200 may continue to be flyable (e.g., temporarily stuck wing flap) or no longer be flyable (e.g., landing with stuck gear) should the set of absolute operating limitations of the aircraft 200 be exceeded. By way of another example, the safe system controller 102 may reject any responses suggested by the one or more autonomy engines 116, and prevent the one or more autonomy engines 116 from adjusting one or more operational parameters of the aircraft 200, that exceed the set of absolute operating limitations of the aircraft 200. By way of another example, the safe system controller 102 may accept (either always accept or accept on a case-by-case basis) any response suggested by the one or more autonomy engines 116, and allow the one or more autonomy engines 116 to adjust one or more operational parameters of the aircraft 200, that will not exceed the set of absolute operating limitations. By way of another example, the safe system controller 102 may analyze actions requested by the one or more autonomy engines 116 that may exceed the set of absolute operating limitations, determine what response should be taken, and provide the determined response to the one or more automation engines 114 and/or the one or more autonomy engines 116 to adjust one or more operational parameters of the aircraft 200.

The safe system controller 102, the one or more automation engines 114, and/or the one or more autonomy engines 116 may be communicatively and/or physically coupled to one or more control systems 204 of the vehicle 200. For example, the one or more control systems 204 may include, but are not limited to, a directional control system for controlling position, speed, and/or direction of the vehicle 200. For instance, the one or more control systems 204 may be include, but are not limited to, an aileron, an elevator, a throttle, a control stick, a brake system, a rudder, an engine, a servo motor, a hydraulic system (e.g., hydraulic power pack), a display, or the like.

Figure 4:
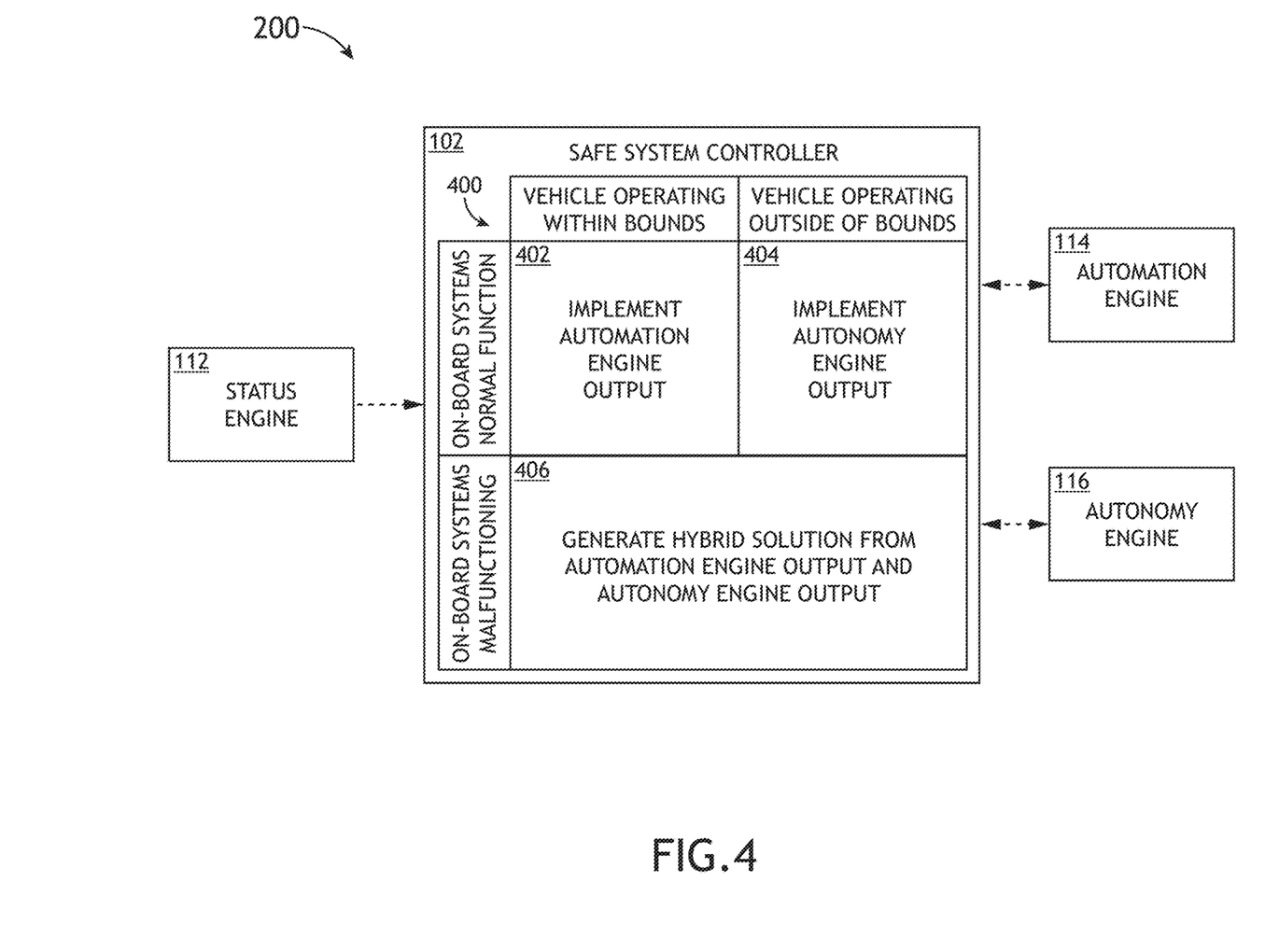
FIG. 4 is a simplified schematic of an exemplary embodiment of a diagrammatic illustration of a set of system states for a safe system controller of an autonomous vehicle, according to the inventive concept disclosed herein.

Referring now to FIG. 4 an exemplary embodiment of a diagrammatic illustration of a set 400 of system states for the aircraft 200 according to the inventive concepts is disclosed herein. It is noted the set of states 400 may be applicable to any type of vehicle 200.

The safe system controller 102 may utilize either the output transmitted from the one or more automation engines 114 or the output transmitted from the one or more autonomy engines 116 to operate the aircraft 200, or may generate a hybrid solution by combining portions of the output transmitted from the one or more automation engines 114 and the output transmitted from the one or more autonomy engines 116, depending on the system state of the aircraft 200.

In a system state 402, where the aircraft 200 is operating within the bounds of the pre-programmed instructions of the one or more automation engines 114 and the one or more on-board systems 202 are functioning normally, the safe system controller 102 may utilize the output transmitted from the one or more automation engines 114 to operate the aircraft 200. For example, as the aircraft 200 flies along a flight path, the aircraft 200 may encounter an event (e.g., unrecorded terrain, weather obstacle, or the like), acquired via the one or more sensors 122, that requires a pitch command of 15 degrees bank to avoid. If the bounded set of automation parameters includes a pitch command of 25 degrees bank for the aircraft 200, the safe system controller 102 may utilize and/or direct the one or more automation engines 114 to avoid the encountered event.

In a system state 404, where the aircraft 200 is operating outside of the bounds of the pre-programmed instructions of the one or more automation engines 114 and the one or more on-board systems 202 are functioning normally, the safe system controller 102 may select the output transmitted from the one or more autonomy engines 116 to operate the aircraft 200. For example, as the aircraft 200 flies along a flight path, the aircraft 200 may encounter an event (e.g., unrecorded terrain, weather obstacle, or the like), acquired via the one or more sensors 122, that requires a pitch command of 35 degrees bank to avoid. If the bounded set of automation parameters includes a bounded pitch command of 25 degrees bank for the aircraft 200, but the bounded set of autonomy parameters includes a bounded pitch command of 40 degrees bank for the aircraft 200, the safe system controller 102 may utilize and/or direct the one or more autonomy engines 116 to avoid the encountered event, as the pitch command of 35 degrees bank falls only within the bounded set of autonomy parameters.

Additionally in the system state 404, where the set of data from a set of the one or more sensors 122 is inconsistent with data from other sensors 122 on the aircraft 200 but the one or more on-board systems 202 are functioning correctly, the safe system controller 102 may utilize the output transmitted from the one or more autonomy engines 116 to operate the aircraft 200. For example, the output transmitted from the one or more autonomy engines 116 may represent the safest response to the inconsistent sensor 122 data (e.g., dump fuel and land at nearest airport in response to blocked pitot tubes for measuring airspeed, maintain path and speed in response to missing sensor data when following a fly-by-wire flight plan, or the like).

Once the aircraft 200 returns to operating within the bounds of the aircraft 200, the safe system controller 102 may transfer control of the aircraft 200 back to the one or more automation engines 114, or may instead direct the one or more autonomy engines 116 to retain control of the aircraft 200.

In a system state 406, where the aircraft 200 is operating either within or outside the bounds of the pre-programmed instructions of the one or more automation engines 114 and the one or more on-board systems 202 are malfunctioning, the safe system controller 102 may generate and implement a hybrid solution from the output of the one or more automation engines 114 and the output of the one or more autonomy engines 116. For example, the output from the one or more autonomy engines 116 may be a solution based on programmed responses to a multitude of on-board system malfunction combinations, while the output from the one or more automation engines 114 may be utilized to validate that the solutions outputted by the one or more autonomy engines 116 are not providing commands outside the capabilities of components of the aircraft 200. In this regard, the hybrid solution may address the one or more malfunctioning on-board systems 302 via the output of the one or more autonomy engines 116, the output of the one or more autonomy engines 116 being kept in check via the output of the one or more automation engines 114.

Once the aircraft 200 returns to operating within the bounds of the aircraft 200, the safe system controller 102 may transfer control of the aircraft 200 solely to the one or more automation engines 114 or may instead transfer control of the aircraft 200 solely to the one or more autonomy engines 116.

The safe system control 102 may combine the output of the one or more automation engines 114 and the output of the one or more autonomy engines 116 in a 50:50 ratio. Alternatively or in addition, the safe system controller 102 may provide a weighting factor to the output from the one or more automation engines 114 and the output from the one or more autonomy engines 116 when generating the hybrid solution. For example, the weighting factor may be based on a probability of successfully avoiding the encountered event. For instance, the one or more autonomy engines 114 may output a solution with a 0% to 100% probability of success (e.g. 50%, 90%, or the like), and the output from the one or more autonomy engines 114 and the output from the one or more automation engines 116 may be combined and adjusted according to the probability of success of the one or more autonomy engines 114 outputted solution. It is noted herein the adjustment of the combined outputs of the one or more autonomy engines 114 and the one or more automation engines 116 may be altered in response to the probability of success of the one or more autonomy engines 116 outputted solution increasing or decreasing.

Figure 5:
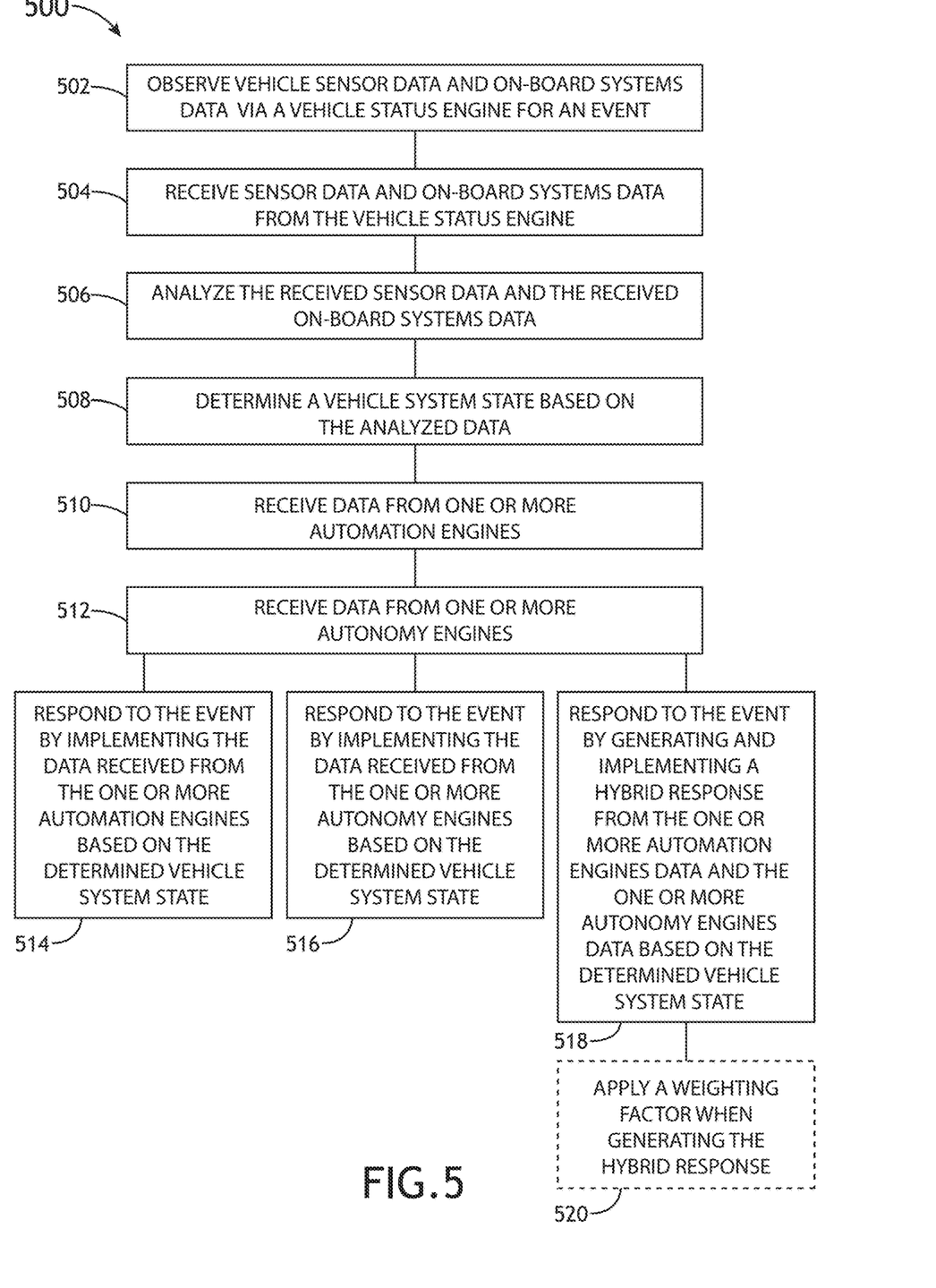
FIG. 5 is a process flow diagram illustrating an exemplary embodiment of a method according to the inventive concepts disclosed herein.

Referring now to FIG. 5, an exemplary embodiment of a method 500 according to the inventive concepts disclosed herein may include one or more of the following steps. For example, the method 500 may be implemented for automated and/or autonomous maneuvering of the vehicle 200.

A step 502 may include acquiring a set of vehicle sensor data and/or acquiring a set of on-board systems data via a vehicle status engine for an event. A set of event data for an event encountered during operation of the vehicle 200 may include, but is not limited to, a set of vehicle sensor data and/or the set of on-board systems data. The set of vehicle sensor data and/or the set of on-board systems data may include, but is not limited to, a set of environmental data (e.g., known terrain data, known obstacle data, unknown obstacle data obtained during operation, unknown terrain data obtained during operation, or the like) acquired by the one or more sensors 112 and the one or more on-board systems 202.

A step 504 may include receiving the set of sensor data and/or receiving the set of on-board systems data from the vehicle status engine. The one or more status engines 112 may receive the set of vehicle sensor data from the one or more sensors 112 via the sensor monitor block 300 and/or may receive the set of on-board systems data from the one or more on-board systems 202 via the on-board systems monitor block 302. The one or more status engines 112 may combine the set of vehicle sensor data and the set of on-board systems data prior to receipt by the safe system controller 102.

A step 506 may include analyzing the received set of sensor data and/or analyzing the received set of on-board systems data. A step 508 may include determining a vehicle system state based on the analyzed sensor data and/or the analyzed on-board systems data. The vehicle system state may include one or more vehicle operational parameters and/or one or more on-board system function parameters, where the one or more vehicle operational parameters and/or one or more on-board system are determined by analyzing the received sensor data and/or analyzing the received on-board systems data.

A step 510 may include receiving a set of data from one or more automation engines. The received set of data may include a set of automation engine data, where the set of automation engine data includes a set of automation operational parameters. A step 512 may include receiving a set of data from one or more autonomy engines. The received set of data may include a set of autonomy engine data, where the set of autonomy engine data includes a set of autonomy operational parameters.

In various steps, one or more responses to the event may be determined from at least one of the set of automation operational parameters or the autonomy operational parameters based on the determined vehicle system state, and the determined one or more responses may be provided to at least one of the one or more automation engines 114 of the vehicle or the one or more autonomy engines 116 of the vehicle to adjust one or more operational parameters of the vehicle 200.

A step 514 may include responding to the event by implementing (e.g., utilizing and/or directing) the data received from the one or more automation engines based on the determined vehicle system state. For example, the one or more vehicle operational parameters may be determined to be within the set of automation operational parameters, such that the one or more automation engines 114 may be implemented (e.g., utilized and/or directed) to respond to the event.

A step 516 may include responding to the event by implementing (e.g., utilizing and/or directing) the data received from the one or more autonomy engines based on the determined vehicle system state. For example, the one or more vehicle operational parameters may be determined to be outside of the set of automation engine parameters but within the set of autonomy operational parameters, such that the one or more autonomy engines 116 may be implemented (e.g., utilized and/or directed) to respond to the event.

A step 518 may include responding to the event by implementing a hybrid response generated from the data from the one or more automation engines and the data from the one or more autonomy engines based on the determined vehicle system state. For example, the one or more on-board system function parameters may indicate one or more on-board systems are malfunctional, such that determining one or more responses may require generating one or more hybrid responses by combining the set of automation operational parameters and the set of autonomy operational parameters.

A step 520 may include applying a weighting factor when generating the one or more hybrid responses.

As will be appreciated from the above, systems and methods according to embodiments of the inventive concepts disclosed herein may be directed to a safe system controller for an autonomous vehicle, where the safe system controller includes the capability to determine counter-procedural measures in response to events that occur during the operation of the vehicle, where the occurring events are outside the bounds of pre-programmed automation information stored on board the autonomous vehicle and/or stored at an exterior location.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A method for operating an autonomous vehicle, comprising:

acquiring a set of event data for an event encountered during operation of the autonomous vehicle, the set of event data including environmental data;

receiving the set of event data from one or more status engines of the autonomous vehicle;

analyzing the received set of event data;

determining a vehicle system state based on the analyzed set of event data;

receiving a set of automation engine data from one or more automation engines of the autonomous vehicle, the set of automation engine data comprising a set of automation operational parameters with a set of pre-programmed instructions, the set of automation operational parameters being bounded with automation thresholds in the set of pre-programmed instructions, the automation thresholds being selected to not damage at least one control system component of the autonomous vehicle when implemented;

receiving a set of autonomy engine data from one or more autonomy engines of the autonomous vehicle, the one or more autonomy engines implementing a machine-learned decision-making process, the set of autonomy engine data comprising a set of autonomy operational parameters, the autonomy thresholds being capable of damaging the at least one control system component of the autonomous vehicle when implemented, wherein the one or more autonomy engines being included in the autonomous vehicle increases a range of autonomous vehicle response to the event encountered during operation of the autonomous vehicle from outside the bounded automation threshold of the one or more automation engines to the bounded autonomy threshold of the one or more autonomy engines;

determining one or more responses to the event based on the environmental data in the set of event data from at least one of the set of automation operational parameters or the autonomy operational parameters based on the determined vehicle system state; and providing the determined one or more responses to at least one of the one or more automation engines of the autonomous vehicle or the one or more autonomy engines of the autonomous vehicle; and adjusting one or more operational parameters of the at least one control system component of the autonomous vehicle to avoid the event encountered during operation of the autonomous vehicle based on the determined one or more responses.

2. The method in claim 1, the acquiring the set of event data for an event encountered during operation, comprising:

acquiring a set of sensor data via one or more sensors couplable to the autonomous vehicle; and acquiring a set of on-board systems data via one or more on-board systems of the autonomous vehicle.

3. The method in claim 2, the set of sensor data and the set of on-board system data being combined by the one or more status engines into a single set of data prior to being received from the one or more status engines.

4. The method in claim 1, the vehicle system state comprising:

one or more vehicle operational parameters; and
one or more on-board system function parameters.

5. The method in claim 4, the determining the one or more responses to the event from at least one of the set of automation operational parameters or the autonomy operational parameters based on the determined vehicle system state comprising:

determining the one or more responses to the event from the set of automation operational parameters if the one or more vehicle operational parameters are within the set of automation operational parameters.

6. The method in claim 5, the adjusting the one or more operational parameters of the at least one control system component of the autonomous vehicle to avoid the event encountered during operation of the autonomous vehicle based on the determined one or more responses comprising:

adjusting the one or more operational parameters of the at least one control system component of the autonomous vehicle based on the determined one or more responses after providing the determined one or more responses to the one or more automation engines of the autonomous vehicle.

7. The method in claim 4, the determining the one or more responses to the event from at least one of the set of automation operational parameters or the autonomy operational parameters based on the determined vehicle system state comprising:

determining the one or more responses to the event from the set of autonomy operational parameters if the one or more vehicle operational parameters are within the set of autonomy operational parameters.

8. The method in claim 7, the adjusting the one or more operational parameters of the at least one control system component of the autonomous vehicle to avoid the event encountered during operation of the autonomous vehicle based on the determined one or more responses comprising:

adjusting the one or more operational parameters of the at least one control system component of the autonomous vehicle based on the determined one or more responses after providing the determined one or more responses to the one or more autonomy engines of the autonomous vehicle.

9. The method in claim 4, the determining one or more responses to the event from at least one of the set of automation operational parameters or the autonomy operational parameters based on the determined vehicle system state comprising:

generating one or more hybrid responses by combining the set of automation operational parameters and the set of autonomy operational parameters if the one or more on-board system function parameters indicate one or more on-board systems are malfunctional; and determining the one or more responses to the event from the one or more hybrid responses.

10. The method in claim 9, further comprising:

applying a weighting factor while generating the one or more hybrid responses by combining the set of automation operational parameters and the set of autonomy operational parameters.

11. The method in claim 9, the adjusting the one or more operational parameters of the at least one control system component of the autonomous vehicle to avoid the event encountered during operation of the autonomous vehicle based on the determined one or more responses comprising:

adjusting the one or more operational parameters of the at least one control system component of the autonomous vehicle based on the determined one or more responses after providing the determined one or more responses to the one or more automation engines of the autonomous vehicle and the one or more autonomy engines of the autonomous vehicle.

12. The method in claim 4, wherein exceeding the one or more operational parameters renders the at least one control system component of the autonomous vehicle non-operable.

13. The method in claim 12, further comprising:

allowing the one or more autonomy engines to adjust one or more operational parameters of the at least one control system component of the autonomous vehicle via the set of autonomy operational parameters where the set of autonomy operational parameters will not exceed the one or more operational parameters.

14. The method in claim 12, further comprising:

preventing the one or more autonomy engines from adjusting one or more operational parameters of the at least one control system component of the autonomous vehicle via the set of autonomy operational parameters where the set of autonomy operational parameters exceed the one or more operational parameters.

15. An autonomous vehicle, comprising:

one or more status engines configured to receive a set of event data for an event encountered during operation, the set of event data including environmental data;

one or more automation engines;
one or more autonomy engines; and
a safe system controller comprising one or more processors configured to execute a set of program instructions stored on a memory medium, the set of program instructions configured to cause the one or more processors to:

receive the set of event data from the one or more status engines;

analyze the received set of event data;

determine a vehicle system state based on the analyzed set of event data;

receive a set of automation engine data from the one or more automation engines, the set of automation engine data comprising a set of automation operational parameters with a set of pre-programmed instructions, the set of automation operational parameters being bounded with automation thresholds in the set of pre-programmed instructions, the automation thresholds being selected to not damage at least one control system component of the autonomous vehicle when implemented;

receive a set of autonomy engine data from the one or more autonomy engines, the one or more autonomy engines implementing a machine-learned decision-making process, the set of autonomy engine data comprising a set of autonomy operational parameters, the autonomy thresholds being capable of damaging the at least one control system component of the autonomous vehicle when implemented, wherein the one or more autonomy engines being included in the autonomous vehicle increases a range of autonomous vehicle response to the event encountered during operation of the autonomous vehicle from outside the bounded automation threshold of the one or more automation engines to the bounded autonomy threshold of the one or more autonomy engines;

determine one or more responses based on the environmental data in the set of event data to the event from at least one of the set of automation operational parameters or the autonomy operational parameters based on the determined vehicle system state; and provide the determined one or more responses to at least one of the one or more automation engines or the one or more autonomy engines; and adjust one or more operational parameters of the at least one control system component of the autonomous vehicle to avoid the event encountered during operation of the autonomous vehicle based on the determined one or more responses.

16. The autonomous vehicle in claim 15, further comprising:
one or more sensors configured to acquire a set of sensor data acquired by one or more sensors; and
one or more on-board systems configured to acquire a set of on-board systems data.

17. The autonomous vehicle in claim 16, the set of sensor data and the set of on-board system data being combined by the one or more status engines into a single set of data prior to being received from the one or more status engines.

18. The autonomous vehicle in claim 16, at least one of the one or more automation engines or the one or more autonomy engines being configured to receive the set of sensor data acquired by the one or more sensors.

19. The autonomous vehicle in claim 16, at least one of the one or more automation engines or the one or more autonomy engines being configured to receive the set of on-board systems data acquired by the one or more on-board systems.

20. The autonomous vehicle in claim 15, further comprising:
one or more external databases, at least one of the one or more status engines, the one or more automation engines, or the one or more autonomy engines being configured to receive a set of external database data from the one or more external databases.

21. The autonomous vehicle in claim 15, further comprising:
one or more communication devices, at least one of the one or more status engines, the one or more automation engines, or the one or more autonomy engines being configured to receive a set of communication device data from the one or more communication devices.

22. The autonomous vehicle in claim 15, further comprising:
a user interface communicatively couplable to the safe system controller, the user interface comprising:
a display device; and
a user input device.

23. A system installed within an autonomous vehicle, comprising:
a safe system controller installed within the autonomous vehicle comprising one or more processors configured to receive a set of data from at least one of one or more status engines, one or more automation engines, or one or more autonomy engines, the one or more processors configured to execute a set of program instructions stored on a memory medium, the set of program instructions configured to cause the one or more processors to:
receive the set of event data for an event encountered during operation from the one or more status engines, the set of event data including environmental data;
analyze the received set of event data;
determine a system state based on the analyzed set of event data;
receive a set of automation engine data from the one or more automation engines, the set of automation engine data comprising a set of automation operational parameters with a set of pre-programmed instructions, the set of automation operational parameters being bounded with automation thresholds in the set of pre-programmed instructions, the automation thresholds being selected to not damage at least one control system component of the system when implemented;
receive a set of autonomy engine data from the one or more autonomy engines, the one or more autonomy engines being implementing a machine-learned decision-making process, the set of autonomy engine data comprising a set of autonomy operational parameters, the autonomy thresholds being capable of damaging the at least one control system component of the system when implemented, wherein the one or more autonomy engines being included in the autonomous vehicle increases a range of autonomous vehicle response to the event encountered during operation of the autonomous vehicle from outside the bounded automation threshold of the one or more automation engines to the bounded autonomy threshold of the one or more autonomy engines;
determine one or more responses to the event based on the environmental data in the set of event data from at least one of the set of automation operational parameters or the autonomy operational parameters based on the determined system state; and
provide the determined one or more responses to at least one of the one or more automation engines or the one or more autonomy engines; and
adjust one or more operational parameters of the at least one control system component of the system to avoid the event encountered during operation of the system based on the determined one or more responses.

* * * * *